(12) United States Patent
Otsuka et al.

(10) Patent No.: US 12,050,385 B2
(45) Date of Patent: Jul. 30, 2024

(54) METHOD FOR MANUFACTURING DIMMING ELEMENT

(71) Applicant: NITTO DENKO CORPORATION, Ibaraki (JP)

(72) Inventors: Masanori Otsuka, Ibaraki (JP); Mariko Hirai, Ibaraki (JP); Hiroyuki Takemoto, Ibaraki (JP); Tiago Ogawa, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 530 days.

(21) Appl. No.: 17/274,967

(22) PCT Filed: Aug. 29, 2019

(86) PCT No.: PCT/JP2019/033909
§ 371 (c)(1),
(2) Date: Mar. 10, 2021

(87) PCT Pub. No.: WO2020/054445
PCT Pub. Date: Mar. 19, 2020

(65) Prior Publication Data
US 2022/0035197 A1 Feb. 3, 2022

(30) Foreign Application Priority Data
Sep. 10, 2018 (JP) .................. 2018-168728

(51) Int. Cl.
*G02F 1/1343* (2006.01)
*G02F 1/1334* (2006.01)

(52) U.S. Cl.
CPC ........ *G02F 1/13439* (2013.01); *G02F 1/1334* (2013.01)

(58) Field of Classification Search
CPC ................................................ G02F 1/13439
(Continued)

(56) References Cited

U.S. PATENT DOCUMENTS 7,351,300 B2 * 4/2008 Takayama ......... H01L 21/76251
156/247
8,043,936 B2 10/2011 Eguchi et al.
(Continued)

FOREIGN PATENT DOCUMENTS

CN    102859422 A     1/2013
EP      3570094 A1   11/2019
(Continued)

OTHER PUBLICATIONS

English Translation of KR20160109465A(Year: 2015).*
(Continued)

*Primary Examiner* — Michael A Tolin
*Assistant Examiner* — Hana C Page
(74) *Attorney, Agent, or Firm* — WHDA, LLP (57) ABSTRACT

A method of manufacturing a light control element including an extraction electrode portion includes the steps of obtaining a light control film including a first base material with a transparent electrode layer and a second base material with a transparent electrode layer arranged so that transparent electrode layers are opposed to each other, a liquid crystal light control layer sandwiched between the base materials with transparent electrode layers, and an extending portion extending in a direction perpendicular to a thickness direction; inserting peeling means between the base materials with transparent electrode layers in the extending portion, to thereby peel off one base material with a transparent electrode layer from the light control film and bending a peeled portion of the one base material with a transparent electrode layer outward, to snap the peeled portion. The one base material has a breakage bending diameter of from 0.1 mm to 5 mm.

7 Claims, 8 Drawing Sheets

(58) Field of Classification Search
USPC .......................................................... 156/714
See application file for complete search history.

(56) References Cited

U.S. PATENT DOCUMENTS

| | | | |
|---|---|---|---|
| 8,048,770 | B2 | 11/2011 | Eguchi et al. |
| 8,048,777 | B2 | 11/2011 | Eguchi et al. |
| 9,054,141 | B2 | 6/2015 | Eguchi et al. |
| 9,472,429 | B2 | 10/2016 | Eguchi et al. |
| 9,764,488 | B2 | 9/2017 | Komatsu et al. |
| 2001/0018949 | A1* | 9/2001 | Mizutani ................ C30B 33/00 257/E21.567 |
| 2005/0236367 | A1* | 10/2005 | Wang ...................... G02F 1/167 216/13 |
| 2008/0132033 | A1 | 6/2008 | Eguchi et al. |
| 2009/0017567 | A1 | 1/2009 | Eguchi et al. |
| 2009/0017599 | A1 | 1/2009 | Eguchi et al. |
| 2009/0023251 | A1 | 1/2009 | Eguchi et al. |
| 2012/0045861 | A1 | 2/2012 | Eguchi et al. |
| 2015/0017751 | A1 | 1/2015 | Eguchi et al. |
| 2015/0059986 | A1 | 3/2015 | Komatsu et al. |
| 2015/0258767 | A1* | 9/2015 | Asakawa ............. B32B 43/006 156/764 |

FOREIGN PATENT DOCUMENTS

| | | |
|---|---|---|
| EP | 3570094 B1 | 6/2022 |
| JP | 3-5135 U | 1/1991 |
| JP | 4-126224 U | 11/1992 |
| JP | 2008-225397 A | 9/2008 |
| JP | 2008-225398 A | 9/2008 |
| JP | 2011-232626 A | 11/2011 |
| JP | 2018-116273 A | 7/2018 |
| KR | 10-2016-0109465 A | 9/2016 |
| TW | 200915546 A | 4/2009 |
| TW | 201528353 A | 7/2015 |

OTHER PUBLICATIONS

International Search Report dated Nov. 5, 2019, issued in counterpart International Application No. PCT/JP2019/033909 (2 pages).
Office Action dated Mar. 27, 2023, issued in counterpart TW application No. 108132190, with English translation. (6 pages).
Office Action dated Feb. 2, 2024, issued in counterpart CN Application No. 201980057537.2, with English translation. (11 pages).

* cited by examiner

METHOD FOR MANUFACTURING DIMMING ELEMENT

TECHNICAL FIELD

The present invention relates to a method of manufacturing a light control element.

BACKGROUND ART

A light control element utilizing the light scattering effect of a composite formed of a polymer and a liquid crystal material has hitherto been developed. Such light control element has a structure in which the liquid crystal material is phase-separated or dispersed in a polymer matrix, and hence a transmission mode for transmitting light and a scattering mode for scattering light can be controlled by matching the refractive indices of the polymer and the liquid crystal material to each other and by applying a voltage to the composite to change the alignment of the liquid crystal material. In order to achieve such driving, the light control element generally has a configuration in which a light control layer including the composite is sandwiched between base materials with transparent electrode layers, and part of each of the transparent electrode layers is exposed to function as an extraction electrode portion in order to supply a drive signal from an external circuit.

In general, as in other liquid crystal display elements, the extraction electrode portions are formed by, through use of a cutting blade or laser light, cutting (half-cutting) a region from an upper surface of the light control element to the light control layer or the base material with a transparent electrode layer on an upper side to expose the transparent electrode layer on a lower side and cutting a region from a lower surface of the light control element to the light control layer or the base material with a transparent electrode layer on the lower side to expose the transparent electrode layer on the upper side (for example, Patent Literature 1 and Patent Literature 2).

However, in the half-cut processing including using the cutting blade, the transparent electrode layer on a side to be used as the extraction electrode portion may be damaged, which may cause disconnection. In addition, in the half-cut processing including using the laser light, the absorption rate of the laser light is low, and the output may vary depending on a material for forming the base material. Accordingly, it may be difficult to perform high-precision half-cut processing. In particular, in a thin light control element, the above-mentioned problems become significant.

CITATION LIST

Patent Literature

[PTL 1] JP 2008-225397 A
[PTL 2] JP 2008-225398 A

SUMMARY OF INVENTION

Technical Problem

The present invention has been made in order to solve the above-mentioned problems, and a primary object of the present invention is to provide a method of obtaining a light control element including an extraction electrode portion without performing half-cut processing.

Solution to Problem

According to one embodiment of the present invention, there is provided a method of manufacturing a light control element including an extraction electrode portion. The method includes: obtaining a light control film including a first base material with a transparent electrode layer and a second base material with a transparent electrode layer arranged so that transparent electrode layers are opposed to each other, a liquid crystal light control layer sandwiched between the first base material with a transparent electrode layer and the second base material with a transparent electrode layer, and an extending portion extending in a direction perpendicular to a thickness direction; inserting peeling means between the first base material with a transparent electrode layer and the second base material with a transparent electrode layer in the extending portion, to thereby peel off one of the first base material with a transparent electrode layer and the second base material with a transparent electrode layer from the light control film; and bending a peeled portion of the one of the first base material with a transparent electrode layer and the second base material with a transparent electrode layer outward, to thereby snap the peeled portion, wherein the one of the first base material with a transparent electrode layer and the second base material with a transparent electrode layer has a breakage bending diameter of from 0.1 mm to 5 mm.

In one embodiment, the light control film includes a first extending portion and a second extending portion, the method includes: inserting the peeling means between the first base material with a transparent electrode layer and the second base material with a transparent electrode layer in the first extending portion, to thereby peel off one of the first base material with a transparent electrode layer and the second base material with a transparent electrode layer from the light control film; bending a peeled portion of the one of the first base material with a transparent electrode layer and the second base material with a transparent electrode layer outward, to thereby snap the peeled portion; inserting the peeling means between the first base material with a transparent electrode layer and the second base material with a transparent electrode layer in the second extending portion, to thereby peel off another of the first base material with a transparent electrode layer and the second base material with a transparent electrode layer from the light control film; and bending a peeled portion of the another of the first base material with a transparent electrode layer and the second base material with a transparent electrode layer outward, to thereby snap the peeled portion, and the first base material with a transparent electrode layer and the second base material with a transparent electrode layer each have a breakage bending diameter of from 0.1 mm to 5 mm.

In one embodiment, an interface between the first base material with a transparent electrode layer and the liquid crystal light control layer and/or an interface between the second base material with a transparent electrode layer and the liquid crystal light control layer has a peeling strength of from 0.2 N/25 mm to 5 N/25 mm.

In one embodiment, the first base material with a transparent electrode layer and/or the second base material with a transparent electrode layer includes a transparent base material and a transparent electrode layer arranged on one side of the transparent base material, and a material for forming the transparent base material includes at least one kind selected from the group consisting of glass, a cycloolefin-based resin, and an acrylic resin.

In one embodiment, the first base material with a transparent electrode layer and/or the second base material with a transparent electrode layer includes a transparent base material, a transparent electrode layer arranged on one side of the transparent base material, and a hard coat layer arranged on another side of the transparent base material.

In one embodiment, the first base material with a transparent electrode layer and/or the second base material with a transparent electrode layer includes a transparent base material, a transparent electrode layer arranged on one side of the transparent base material, and hard coat layers arranged on another side of the transparent base material, and between the transparent base material and the transparent electrode layer.

In one embodiment, the liquid crystal light control layer has a thickness of 15 µm or less.

Advantageous Effects of Invention

According to the present invention, the light control element including the extraction electrode portion can be easily obtained without performance of half-cut processing.

DESCRIPTION OF EMBODIMENTS

Embodiments of the present invention are described below, but the present invention is not limited to these embodiments.

A method of manufacturing a light control element including an extraction electrode portion of the present invention includes:

obtaining a light control film including a first base material with a transparent electrode layer and a second base material with a transparent electrode layer arranged so that transparent electrode layers are opposed to each other, a liquid crystal light control layer sandwiched between the base materials with transparent electrode layers, and an extending portion extending in a direction perpendicular to a thickness direction (preparation step for a light control film);

inserting peeling means between the base materials with transparent electrode layers in the extending portion, to thereby peel off one of the base materials with transparent electrode layers from the light control film (peeling step for a base material with a transparent electrode layer); and bending a peeled portion of the one of the base materials with transparent electrode layers outward, to thereby snap the peeled portion (removal step for the base material with a transparent electrode layer). The method may further include any appropriate additional step as required. Now, each of the steps is described in detail.

A. Preparation Step for Light Control Film

Figure 1A:
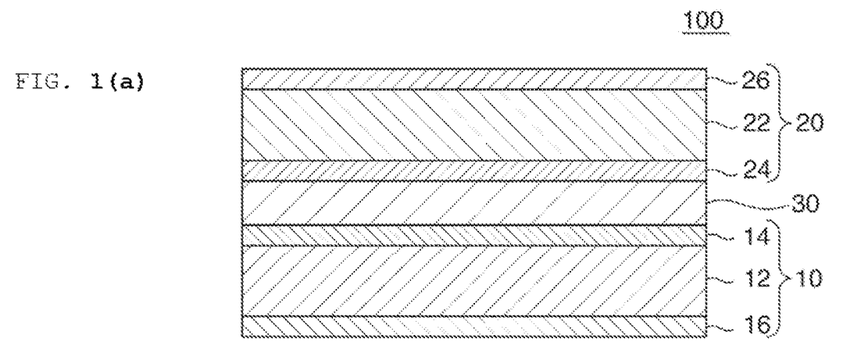
FIG. 1(a) is a schematic sectional view of an example of a light control film applicable to the present invention.
Figure 1B:
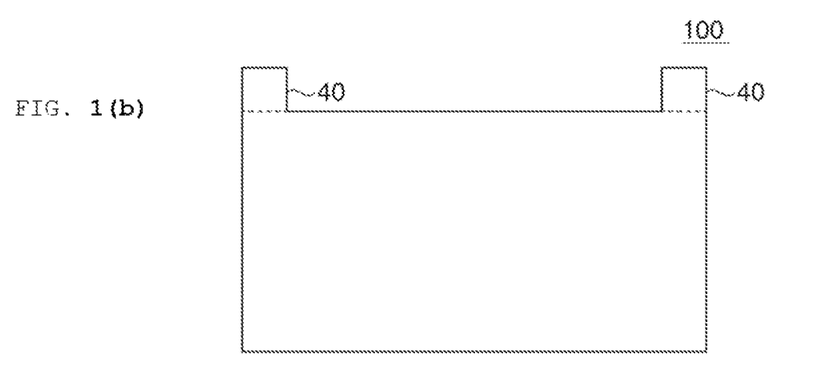
FIG. 1(b) is a schematic top view thereof.
Figure 1C:
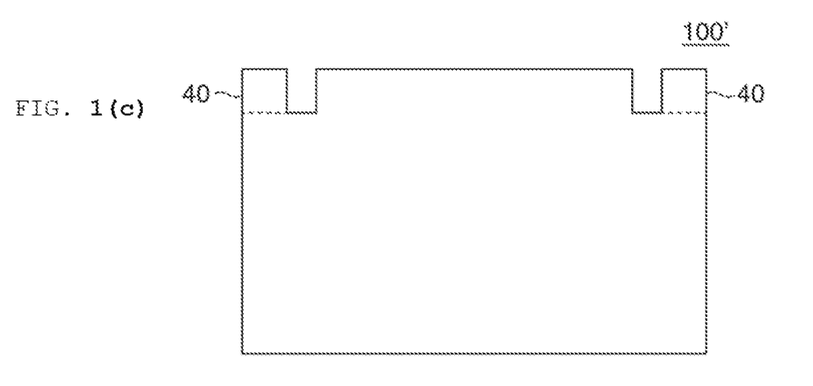
FIG. 1(c) is a schematic top view of another example of the light control film.

FIG. 1(a) and FIG. 1(b) are a schematic sectional view and a schematic top view, respectively, of an example of a light control film applicable to the present invention. In addition, FIG. 1(c) is a schematic top view of another example of the light control film applicable to the present invention. As illustrated in FIG. 1(a), a light control film 100 includes a first base material 10 with a transparent electrode layer, a second base material 20 with a transparent electrode layer, and a liquid crystal light control layer 30 sandwiched between the base materials 10 and 20 with transparent electrode layers. In addition, as illustrated in FIG. 1(b) and FIG. 1(c), the light control film 100 and a light control film 100' each include an extending portion 40 extending in a direction perpendicular to a thickness direction. In the method of the present invention, one of the base materials with transparent electrode layers is removed in the extending portion, to thereby expose the transparent electrode layer of the other base material with a transparent electrode layer. With this configuration, an extraction electrode portion is formed. One extraction electrode portion is generally arranged for each of the transparent electrode layers, and hence it is preferred that the light control film have two extending portions. As used herein, a device which includes the extraction electrode portion and which is capable of being connected to an external circuit is sometimes referred to as "light control element", and a device in a state in which no extraction electrode portion is formed is sometimes referred to as "light control film".

A-1. First Base Material with Transparent Electrode Layer

As illustrated in FIG. 1(a), the first base material 10 with a transparent electrode layer includes a first transparent base material 12, a first transparent electrode layer 14 arranged on one side thereof, and a first hard coat layer 16 arranged on the other side thereof. The first base material 10 with a transparent electrode layer may include a second hard coat layer (not shown) between the first transparent base material 12 and the first transparent electrode layer 14 instead of the first hard coat layer 16 or in addition to the first hard coat layer 16. In addition, the first base material with a transparent electrode layer may not include any of the first hard coat layer and the second hard coat layer. The first base material with a transparent electrode layer includes preferably the first hard coat layer, more preferably both the first hard coat layer and the second hard coat layer. In addition, although not shown, an alignment film may be arranged on the surface of the transparent electrode layer in accordance with a drive mode.

Figure 11:
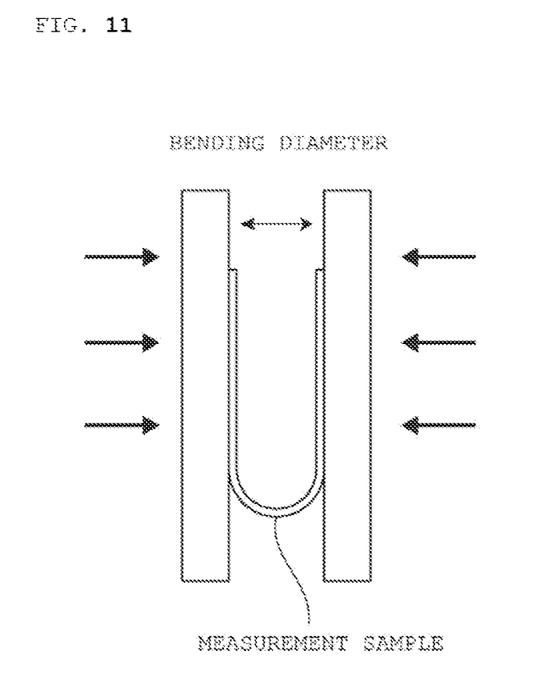
FIG. 11 is a schematic view for illustrating a method of measuring a breakage bending diameter.

The first base material with a transparent electrode layer has a breakage bending diameter of typically from 0.1 mm to 5.0 mm, preferably from 1.0 mm to 4.0 mm. The base material with a transparent electrode layer having a breakage bending diameter falling within the above-mentioned ranges can be easily snapped at a desired position to be removed, and hence the extraction electrode portion can be formed without performance of half-cut processing. As used herein, the breakage bending diameter means the minimum bending diameter at which bending can be performed without causing breakage. The breakage bending diameter is a value defined by an interval between parallel plates when a film is arranged so as to be bent in a U-shape between the plates, and the interval between the plates is decreased to break the film in a U-shaped film bending test method as illustrated in FIG. 11.

The surface resistance value of the first base material with a transparent electrode layer is preferably from $0.1\Omega/\square$ to $1,000\Omega/\square$, more preferably from 0.5 WO to $300\Omega/\square$, still more preferably from 1 WO to 200 $\Omega/\square$.

The haze value of the first base material with a transparent electrode layer is preferably 20% or less, more preferably 10% or less, still more preferably from 0.1% to 10%.

The total light transmittance of the first base material with a transparent electrode layer is preferably 30% or more, more preferably 60% or more, still more preferably 80% or more.

The first transparent electrode layer may be formed by using, for example, a metal oxide, such as indium tin oxide (ITO), zinc oxide (ZnO), or tin oxide ($SnO_2$). In this case, the metal oxide may be an amorphous metal oxide or a crystalline metal oxide. Alternatively, the first transparent electrode layer may be formed of a metal nanowire, such as a silver nanowire (AgNW), a carbon nanotube (CNT), an organic conductive film, a metal layer, or a laminate thereof. The first transparent electrode layer may be patterned into a desired shape depending on the purposes.

The first transparent electrode layer has a thickness of preferably from 0.01 µm to 0.10 µm, more preferably from 0.01 µm to 0.045 µm.

The first transparent electrode layer is typically arranged directly on one surface of the first transparent base material (surface of the hard coat layer when the hard coat layer is arranged) by using a method such as sputtering.

The first transparent base material is made of any appropriate material as long as a base material with a transparent electrode layer having the above-mentioned breakage bending diameter is obtained. Specifically, a glass base material or a polymer base material is preferably used.

The polymer base material is typically a polymer film containing a thermoplastic resin as a main component. Examples of the thermoplastic resin include: a cycloolefin-based resin, such as polynorbornene; an acrylic resin; a polyester-based resin; a polycarbonate resin; and a cellulose-based resin. Of those, a cycloolefin-based resin or an acrylic resin may be preferably used. Each of those resin films have relatively high brittleness while having flexibility at the same time, and thus the films can be easily snapped by bending. The thermoplastic resins may be used alone or in combination thereof.

The first transparent base material has a thickness of preferably from 20 µm to 200 µm, more preferably from 30 µm to 100 µm.

The first hard coat layer and the second hard coat layer impart scratch resistance and surface smoothness to the light control film, and may contribute to setting of the breakage bending diameter of the first base material with a transparent electrode layer within the above-mentioned ranges. The hard coat layer is, for example, a cured layer of any appropriate UV-curable resin. Examples of the UV-curable resin include an acrylic resin, a silicone-based resin, a polyester-based resin, a urethane-based resin, an amide-based resin, and an epoxy-based resin. The hard coat layer may be formed by applying an application liquid containing a monomer or an oligomer of such UV-curable resin, and as required, a photopolymerization initiator and the like, to the first transparent base material, followed by drying, and irradiating the dried application layer with UV light to cure the application layer.

The hard coat layer has a thickness of preferably from 0.4 µm to 40 µm, more preferably from 1 µm to 10 µm. When the thickness of the hard coat layer is set to fall within the above-mentioned ranges, the hard coat layer is easily broken at the time of bending, and the breakage of the hard coat layer induces breakage of the transparent base material, and as a result, the base material with a transparent electrode layer can be easily broken. In one embodiment, the thickness of the hard coat layer (total thickness when the first and second hard coat layers are formed) may be set to from 1% to 20%, preferably from 2% to 15% of the thickness of the first transparent base material.

A-2. Second Base Material with Transparent Electrode Layer

As illustrated in FIG. 1(a), the second base material 20 with a transparent electrode layer includes a second transparent base material 22, a second transparent electrode layer 24 arranged on one side thereof, and a third hard coat layer 26 arranged on the other side thereof. The second base material 20 with a transparent electrode layer may include a fourth hard coat layer (not shown) between the second transparent base material 22 and the second transparent electrode layer 24 instead of the third hard coat layer 26 or in addition to the third hard coat layer 26. In addition, the second base material with a transparent electrode layer may not include any of the third hard coat layer and the fourth hard coat layer. The second base material 20 with a transparent electrode layer includes preferably the third hard coat layer, more preferably both the third hard coat layer and the fourth hard coat layer. In addition, although not shown, an alignment film may be arranged on the surface of the transparent electrode layer in accordance with a drive mode.

The second base material with a transparent electrode layer has a breakage bending diameter of typically from 0.1 mm to 5.0 mm, preferably from 1.0 mm to 4.0 mm. The base material with a transparent electrode layer having a breakage bending diameter falling within the above-mentioned ranges can be easily snapped at a desired position to be removed, and hence the extraction electrode portion can be formed without performance of half-cut processing.

The surface resistance value of the second base material with a transparent electrode layer is preferably from $0.1\Omega/\square$ to $1,000\Omega/\square$, more preferably from $0.5\Omega/\square$ to $300\Omega/\square$, still more preferably from $1\Omega/\square$ to 200 $\Omega/\square$.

The haze value of the second base material with a transparent electrode layer is preferably 20% or less, more preferably 10% or less, still more preferably from 0.1% to 10%.

The total light transmittance of the second base material with a transparent electrode layer is preferably 30% or more, more preferably 60% or more, still more preferably 80% or more.

The same description as that of the first transparent electrode layer, the first transparent base material, the first hard coat layer, and the second hard coat layer can be applied to the second transparent electrode layer, the second transparent base material, the third hard coat layer, and the fourth hard coat layer, respectively. The second base material with a transparent electrode layer may have the same configuration as that of the first base material with a transparent electrode layer or may have a different configuration.

A-3. Liquid Crystal Light Control Layer

The liquid crystal light control layer 30 typically has a structure in which a liquid crystal compound is dispersed in a resin matrix. Specific examples thereof include a light control layer containing a polymer dispersed liquid crystal and a light control layer containing a polymer network liquid crystal. The polymer dispersed liquid crystal has a structure in which liquid crystals are phase-separated in a polymer. The polymer network liquid crystal has a structure in which liquid crystals are dispersed in a polymer network, and the liquid crystals in the polymer network have a continuous phase.

In the present invention, from the viewpoint of easily peeling off the base material with a transparent electrode layer, it is preferred that a peeling strength at an interface between the liquid crystal light control layer and the base material with a transparent electrode layer be relatively small. The peeling strength at the interface between the liquid crystal light control layer and the first base material with a transparent electrode layer is preferably from 0.2 N/25 mm to 5 N/25 mm, more preferably from 0.6 N/25 mm to 3 N/25 mm. Similarly, the peeling strength at the interface between the liquid crystal light control layer and the second base material with a transparent electrode layer is preferably from 0.2 N/25 mm to 5 N/25 mm, more preferably from 0.6 N/25 mm to 3 N/25 mm.

The adjustment of the peeling strength may be performed, for example, by changing the viscosity and polarity of the resin matrix to change its adhesiveness and adhesive property with respect to the base material with a transparent electrode layer (mainly, the transparent electrode layer). Specifically, the peeling strength may be decreased, for example, through use of a highly flexible resin matrix, through use of a resin matrix that is non-polarized or low-polarized through a reaction with a polar group, such as a carboxyl group, in advance, or through decrease in cohesive force of the resin matrix.

Any appropriate liquid crystal compound of a non-polymeric type is used as the liquid crystal compound. Examples thereof include nematic, smectic, and cholesteric liquid crystal compounds. The nematic liquid crystal compound is preferably used from the viewpoint of achieving excellent transparency in a transmission mode. Examples of the nematic liquid crystal compound include a biphenyl-based compound, a phenyl benzoate-based compound, a cyclohexylbenzene-based compound, an azoxybenzene-based compound, an azobenzene-based compound, an azomethine-based compound, a terphenyl-based compound, a biphenyl benzoate-based compound, a cyclohexylbiphenyl-based compound, a phenylpyridine-based compound, a cyclohexylpyrimidine-based compound, and a cholesterol-based compound.

The content ratio of the liquid crystal compound in the liquid crystal light control layer is, for example, 10 wt % or more, preferably 30 wt % or more, more preferably 35 wt % or more, still more preferably 40 wt % or more. The content ratio is, for example, 90 wt % or less, preferably 70 wt % or less. The peeling strength at the interface between the liquid crystal light control layer and the base material with a transparent electrode layer can be adjusted also by the content ratio of the liquid crystal compound. When the content ratio of the liquid crystal compound is increased, the adhesion area between the transparent electrode layer and the resin matrix is reduced, and hence the peeling strength can be decreased. When the content ratio of the liquid crystal compound is decreased, the peeling strength can be increased.

A resin for forming the resin matrix may be appropriately selected in accordance with the light transmittance, the refractive index of the liquid crystal compound, the adhesive force with respect to the base material with a transparent electrode layer, and the like. Examples thereof include: a water-soluble resin or water-dispersible resin, such as a urethane-based resin, a polyvinyl alcohol-based resin, a polyethylene-based resin, a polypropylene-based resin, and an acrylic resin, and a liquid crystal polymer; and a curable resin, such as a (meth)acrylic resin, a silicone-based resin, an epoxy-based resin, a fluorine-based resin, a polyester-based resin, or a polyimide resin. Of those, water-soluble or water-dispersible urethane-based resin and acrylic resin may be preferably used.

The content ratio of the matrix-forming resin in the liquid crystal light control layer is, for example, 90 wt % or less, preferably 70 wt % or less, more preferably 65 wt % or less, still more preferably 60 wt % or less. In addition, the content ratio is, for example, 10 wt % or more, preferably 30 wt % or more.

The liquid crystal light control layer has a thickness of preferably 30 μm or less, more preferably 20 μm or less, still more preferably 15 μm or less. The lower limit of the thickness of the liquid crystal light control layer may be set to, for example, 5 μm. In the processing of the light control film including a liquid crystal light control layer with a small thickness as described above, the effects of the present invention can be particularly suitably obtained.

The liquid crystal light control layer may be produced by any appropriate method. Specific examples thereof include production methods of an emulsion system and a phase separation system. According to the emulsion system, the adhesiveness between the liquid crystal light control layer and the base material with a transparent electrode layer, and the like can be easily controlled as compared to the phase separation system, and hence the emulsion system may be advantageous from the viewpoint of obtaining the above-mentioned preferred peeling strength.

A production method for a liquid crystal light control layer of the emulsion system includes, for example, applying an emulsion application liquid containing a matrix-forming resin and a liquid crystal compound to the surface of the transparent electrode layer of the first base material with a transparent electrode layer to form an application layer, and drying the application layer to form a resin matrix from the matrix-forming resin. The emulsion application liquid is preferably an emulsion containing a mixed liquid of the matrix-forming resin and an application solvent in a continuous phase, and containing the liquid crystal compound in a dispersion phase. Through application and drying of the emulsified application liquid, a liquid crystal light control layer having a configuration in which the liquid crystal compound is dispersed in the resin matrix can be formed. Typically, the second base material with a transparent electrode layer is laminated on the liquid crystal light control layer to obtain a light control film.

A-4. Extending Portion

The extending portion 40 is a portion in which one of the base materials with transparent electrode layers and the liquid crystal light control layer are removed to obtain the extraction electrode portion. When the extending portion is arranged so as to be connected to the main body of a light control portion that exhibits a light control function only on one side, the base material with a transparent electrode layer can be easily snapped. The entire region of the extending portion may be formed into the extraction electrode portion, or part of the extending portion may be formed into the extraction electrode portion. When the entire region of the extending portion is formed into the extraction electrode portion, one of the base materials with transparent electrode layers is snapped in the base portion of the extending portion (portion indicated by the dotted line in the figure).

In the illustrated example, the extending portion has a substantially rectangular shape in top view, but its shape is not limited to this shape. The extending portion may have any appropriate shape capable of functioning as the extraction electrode portion.

The light control film including the extending portion may be obtained, for example, by producing or purchasing an elongated light control film and punching out the light control film into a corresponding shape.

B. Peeling Step for Base Material with Transparent Electrode Layer

In the peeling step for the base material with a transparent electrode layer, peeling means is inserted between the base materials with transparent electrode layers in the extending portion, and one of the base materials with transparent electrode layers is peeled off from the light control film. The liquid crystal light control layer containing a dispersed liquid crystal compound has a cohesive force smaller than that of the base material with a transparent electrode layer. In addition, the peeling strength at the interface between the liquid crystal light control layer and the base material with a transparent electrode layer is preferably set to be relatively small. Accordingly, the peeling means can be easily inserted between the base materials with transparent electrode layers, and as a result, the peeling of the base material with a transparent electrode layer can be induced.

FIGS. 2(a) to 3(c) are schematic side views and schematic top views, respectively, for illustrating an example of the peeling step for the base material with a transparent electrode layer. In the illustrated example, the light control film 100 is placed on a worktable 300, and peeling means 200 is inserted into the entire region of the extending portion along the direction in which the base of the extending portion 40 (line indicated by the dotted line in the figure) extends. In a region into which the peeling means has been inserted, the upper base material with a transparent electrode layer can be peeled off from the light control film. The light control film is preferably fixed onto the worktable through use of a suction pad or the like.

The shape of the peeling means 200 is not limited as long as the peeling means 200 can be inserted between the base materials with transparent electrode layers to peel off one of the base materials with transparent electrode layers. The peeling means is typically a thin plate-like member, preferably a thin plate-like blade member (for example, a razor blade-like blade member) having a blade on an end side to be inserted.

Figure 4A:
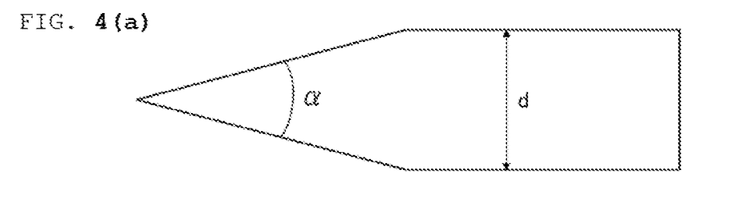
FIGS. 4(a) and 4(b) are each a schematic side view for illustrating a shape of peeling means.
Figure 4B:
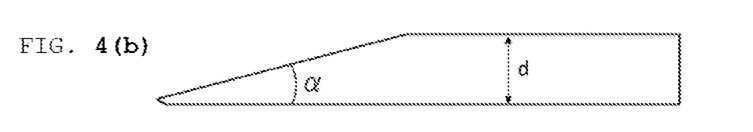

When the peeling means has a blade, the blade may be a single-edged blade or a double-edged blade. In addition, the tip of a blade edge may be a sharped blade or a rounded blade. FIG. 4(a) and FIG. 4(b) are schematic side views for illustrating the shapes of the double-edged and single-edged peeling means, respectively. A blade edge angle α may be preferably from 10° to 40°, more preferably from 15° to 35°, still more preferably from 20° to 30°. In addition, a thickness d of the peeling means is preferably from 50 μm to 1,000 μm, more preferably from 60 μm to 600 μm.

Figure 5:
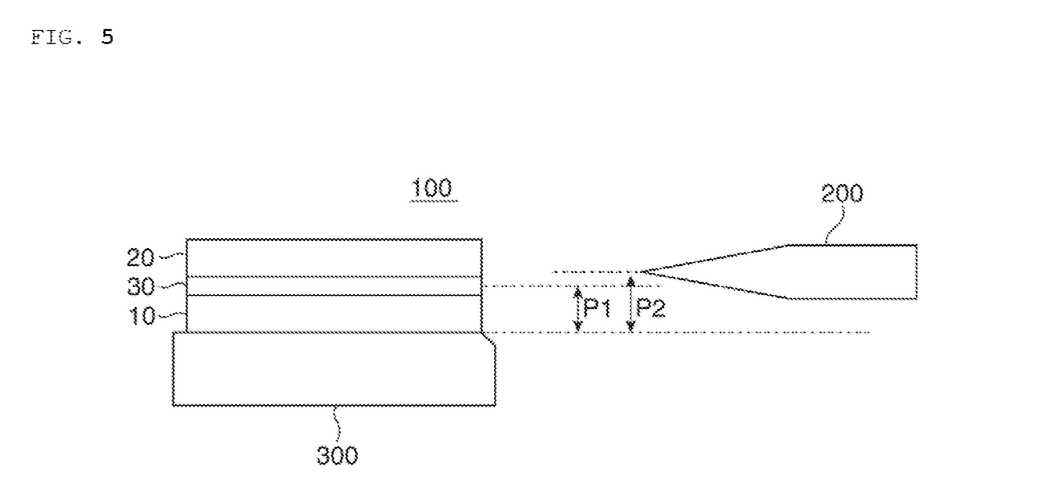
FIG. 5 is a schematic view for illustrating a positional relationship between the light control film and the peeling means.

There may be cases in which the peeling means cuts through the liquid crystal light control layer and enters between the base materials with transparent electrode layers, and in which the peeling means induces interfacial peeling between the base material with a transparent electrode layer and the liquid crystal light control layer. Accordingly, it is not always required to cause the peeling means to enter the liquid crystal light control layer by cutting, and the peeling means may be pressed against the vicinity of the interface to induce interfacial peeling. FIG. 5 is a schematic view for illustrating a positional relationship between the light control film and the peeling means when the peeling means is inserted. When the center height of the liquid crystal light control layer 30 in the light control film 100 placed on the worktable is denoted by P1, and the height of the tip of the end side of the peeling means 200 is denoted by P2, P2-P1 may be set to fall within the range of preferably from −100 μm to 100 μm, more preferably from −60 μm to 60 μm, still more preferably from −40 μm to 40 μm. In addition, when the thickness of the base material with a transparent electrode layer is defined as 100, P2-P1 is preferably between −50 and 50. According to such positional relationship, even when the thickness of the liquid crystal light control layer is small (for example, the thickness is about 10 μm), the peeling means can be suitably inserted between the base materials with transparent electrode layers and peel off the base material with a transparent electrode layer.

Such configuration that the peeling means sandwiches the base material with a transparent electrode with the worktable is formed when the peeling means is inserted into the light control film. Accordingly, it is preferred that the peeling means has such elasticity as to be capable of being bent upward in accordance with a stress. Such peeling means may be formed through use of a metal such as stainless steel.

The moving speed of the peeling means at the time of insertion may be set to preferably from 1 mm/sec to 100 mm/sec, more preferably from 2 mm/sec to 50 mm/sec, still more preferably from 3 mm/sec to 30 mm/sec.

An insertion angle Ell of the peeling means in the thickness direction of the light control film may be set to, for example, from −30° to 30°, preferably from −20° to 20°, more preferably from −10° to 10° with respect to a direction (horizontal direction) perpendicular to the thickness direction.

In addition, when the peeling means is pressed against a side surface of the extending portion, the peeling means may be pressed so that the end side of the peeling means (preferably the end side having a blade) and an end side of the extending portion form an angle so as to be parallel to each other. Alternatively, the peeling means may be pressed so that the end side of the peeling means and the end side of the extending portion form a non-parallel angle. When the peeling means is pressed so as to form a non-parallel angle, an angle θ2 formed by the end side of the peeling means and the end side of the extending portion may be set to, for example, from 1° to 40°, more specifically, from 5° to 30° or from 10° to 25°.

C. Removal Step for Base Material with Transparent Electrode Layer

In the removal step for the base material with a transparent electrode layer, the peeled portion of the base material with a transparent electrode layer is bent outward to be snapped. In the present invention, the base material with a transparent electrode layer having a predetermined breakage bending diameter is used, and hence the peeled portion can be easily snapped by the bending.

Figure 6:
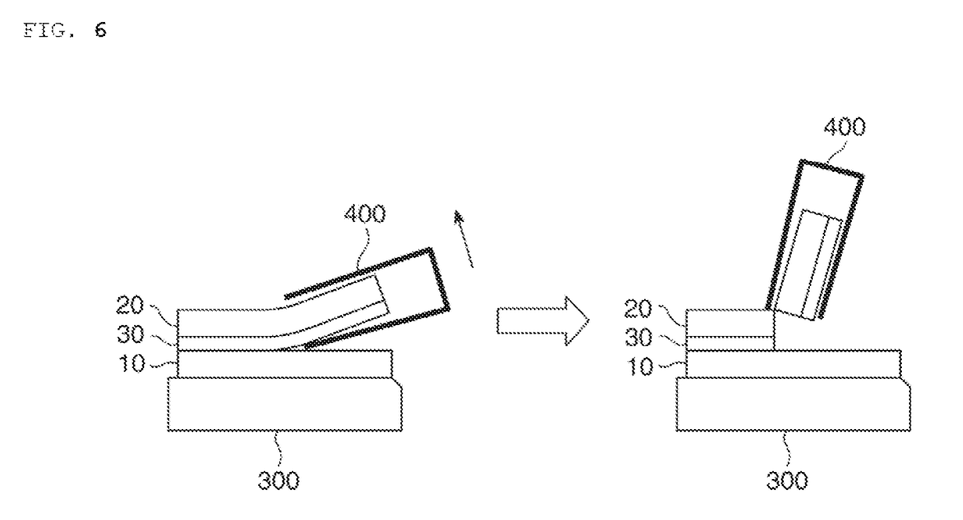
FIG. 6 is a schematic view for illustrating an example of a removal step for the base material with a transparent electrode layer.

FIG. 6 is a schematic view for illustrating the removal step for the base material with a transparent electrode layer according to one embodiment. In this embodiment, the peeled portion of the base material with a transparent electrode layer is bent outward (in the illustrated example, the peeled portion of the second base material 20 with a transparent electrode layer is lifted upward) under a state in which the peeled portion is held with a gripper 400 having a tip that is sharper than the breakage bending diameter of the base material and having a substantially U-shaped cross-section. Through use of the gripper 400, the starting point of bending can be satisfactorily controlled, and as a result, the base material with a transparent electrode layer can be easily snapped at a desired position.

Figure 7:
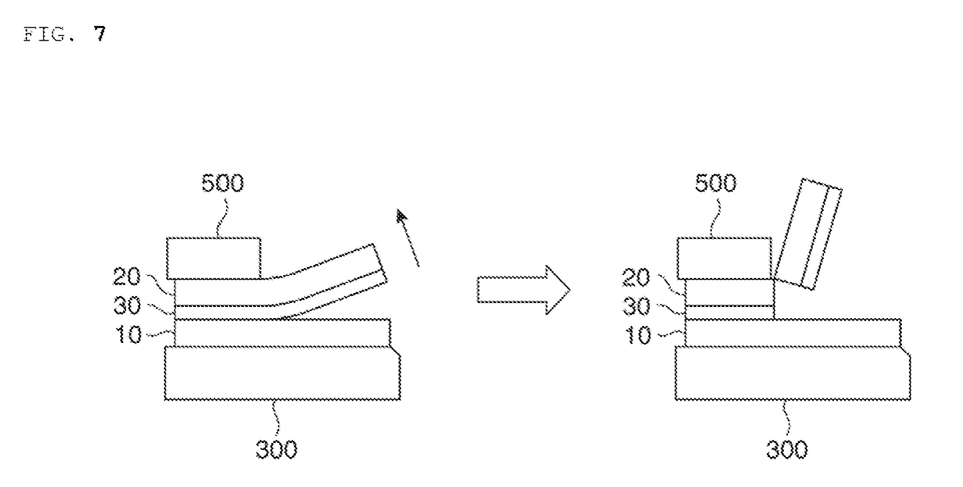
FIG. 7 is a schematic view for illustrating another example of the removal step for the base material with a transparent electrode layer.

FIG. 7 is a schematic view for illustrating the removal step for the base material with a transparent electrode layer according to another embodiment. In this embodiment, the peeled portion is bent outward (in the illustrated example, the peeled portion of the second base material 20 with a transparent electrode layer is lifted upward) while a portion of the base material with a transparent electrode layer, which has not been peeled, is pressed with a pressure jig 500 having a tip that is sharper than the breakage bending diameter of the base material. Through use of the pressure jig 500, the starting point of bending can be satisfactorily controlled, and as a result, the base material with a transparent electrode layer can be easily snapped at a desired position.

When the peeled portion of one of the base materials with transparent electrode layers is snapped to be removed as described above, the transparent electrode layer in a corresponding portion of the other base material with a transparent electrode layer can be exposed, and the exposed portion may be used as an extraction electrode. When part or the entirety of the liquid crystal light control layer remains on the surface of the film having the peeled portion removed therefrom, the remaining liquid crystal light control layer is swollen or dissolved through use of a solvent capable of swelling or dissolving the liquid crystal light control layer. Then, the liquid crystal light control layer is removed by wiping with a waste cloth or the like. With this configuration, the transparent electrode layer of the other base material with a transparent electrode layer can be exposed. A solvent that can dissolve the liquid crystal compound and dissolve or swell the resin matrix, for example, any one of the following compounds may be used as such solvent: an alcohol, such as anhydrous ethanol, methanol, or isopropanol (IPA); an ester, such as ethyl acetate or methyl acetate; a ketone, such as methyl ethyl ketone (MEK) or methyl isobutyl ketone (MIBK); and water, such as alkali washing water or pure water; and a mixed solvent thereof.

As described above, the light control film preferably has two extending portions. Accordingly, in one of the extending portions, the peeling step and the removal step for one of the base materials with transparent electrode layers are performed. Then, the light control film is turned upside down as required, and thereafter, in the other extending portion, the peeling step and the removal step for the other base material with a transparent electrode layer are performed. With this configuration, a light control element having an extraction electrode portion formed for each of the transparent electrodes can be obtained.

EXAMPLES

Now, the present invention is specifically described by way of Example. However, the present invention is by no means limited by Example. Measurement methods for characteristics are as described below. In addition, in Example and Comparative Examples, "part(s)" and "%" are by weight unless otherwise specified.

<<Breakage Bending Diameter>>

The breakage bending diameter of a base material with a transparent electrode layer was measured as described below. As illustrated in FIG. 11, in a U-shaped film bending tester, the base material with a transparent electrode layer was arranged so as to be bent in a U-shape between two parallel plates so that the transparent electrode layer was positioned on an outer side with respect to the transparent base material. The interval between the plates was decreased, and an interval between the plates when the base material was broken was measured.

<<Peeling Strength at Interface between Base Material with Transparent Electrode Layer and Liquid Crystal Light Control Layer>>

A peeling strength at an interface between the base material with a transparent electrode layer and a liquid crystal light control layer was measured as described below. A strip-like test piece having a width of 25 mm was provided with a starting point for peeling in accordance with "Determination of peel strength of bonded assemblies" of JIS K 6854-3:1999. After that, the test piece was peeled off at room temperature at a speed of 300 mm/min in a direction of 180°, and its peeling stress was measured.

Example 1

1. Preparation Step for Light Control Film

(Production of First and Second Base Materials with Transparent Electrode Layers)

Both surfaces of a cycloolefin-based transparent base material (manufactured by Zeon Corporation, norbornene-based resin film, product name: "ZF-16", thickness: 40 µm, Re[590]: 5 nm) were subjected to corona treatment. Then, an application liquid containing 49 parts of trifunctional acrylic PETA, 1 part of an initiator (Irgacure 907), and 50 parts of ethyl acetate was applied to each of the surfaces, and the ethyl acetate was dried. After that, the resultant was irradiated with UV light from a high-pressure mercury UV lamp at 300 mJ/m$^2$, to thereby form a hard coat layer having a thickness of 2 µm. Further, an ITO layer having a thickness of 25 nm was formed on one of the surfaces by a sputtering method, and was annealed at 140° C. for 1 hour to form an ITO crystal film (transparent electrode layer) having a resistance value of 100Ω/□. Thus, first and second base materials with transparent electrode layers each having a configuration of [hard coat layer/cycloolefin-based transparent base material/hard coat layer/transparent electrode layer] were obtained. The breakage bending diameter of each of the obtained first and second base materials with transparent electrode layers was 2 mm.

(Production of Liquid Crystal Compound)

Compounds having the following compositions were mixed at 150° C. for 20 minutes, and were then slowly cooled to room temperature to obtain a liquid crystal compound (1) having Δn of 0.12, a viscosity of 21 cP, Δε of 10.1, and a liquid crystal temperature of from 3° C. to 52° C.

(Production of Liquid Crystal Light Control Layer)

50 Parts of the liquid crystal compound (1) was added to parts (solid content) of a urethane emulsion solution (manufactured by Kusumoto Chemicals, Ltd., product name: "NeoRez R967"), followed by stirring with a homogenizer, to thereby obtain an emulsion application liquid containing liquid droplets (average particle diameter: 5 μm) of the liquid crystal compound. The emulsion application liquid was applied to the surface of the first base material with a transparent electrode layer on the transparent electrode layer side, followed by drying, to thereby form a liquid crystal light control layer having a thickness of 12 μm.

(Production of Light Control Film)

Figure 8:
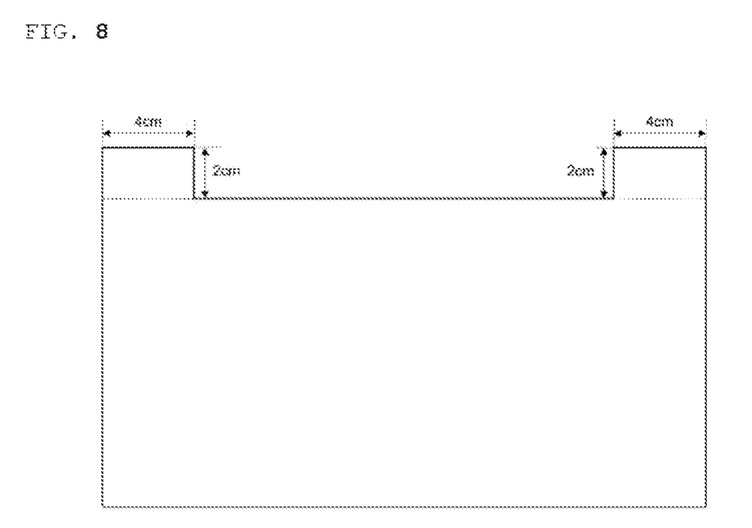
FIG. 8 is a schematic top view of a light control film produced in Example 1.

The second base material with a transparent electrode layer was laminated on the liquid crystal light control layer so that the transparent electrode layer was opposed to the liquid crystal light control layer, to thereby obtain a light control film. Then, the obtained light control film was punched out with a Thomson blade to obtain a light control film having two extending portions as illustrated in FIG. 8. When a peeling strength at an interface between the liquid crystal light control layer and the base material with a transparent electrode layer in the light control film was measured, the peeling strength was 0.9 N/25 mm, and interlayer peeling occurred between the liquid crystal light control layer and the second base material with a transparent electrode layer.

2. Peeling Step for Second Base Material with Transparent Electrode Layer

Figure 2A:
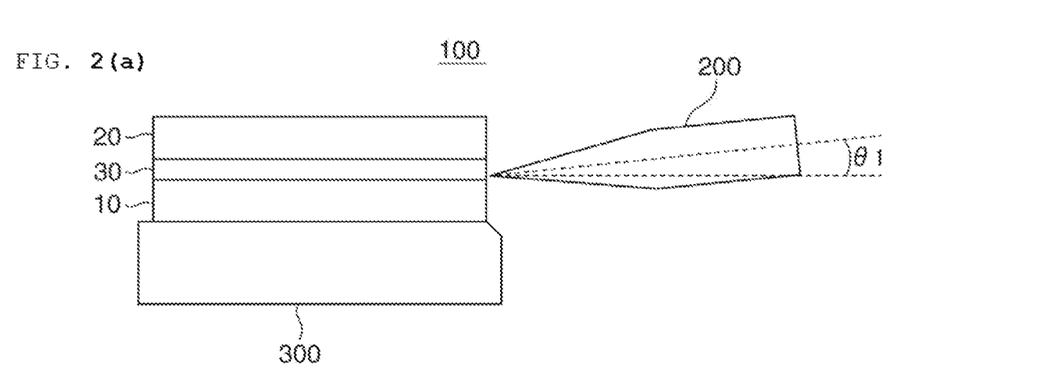
FIGS. 2(a) and 2(b) are each a schematic side view for illustrating an example of a peeling step for a base material with a transparent electrode layer.
Figure 2B:
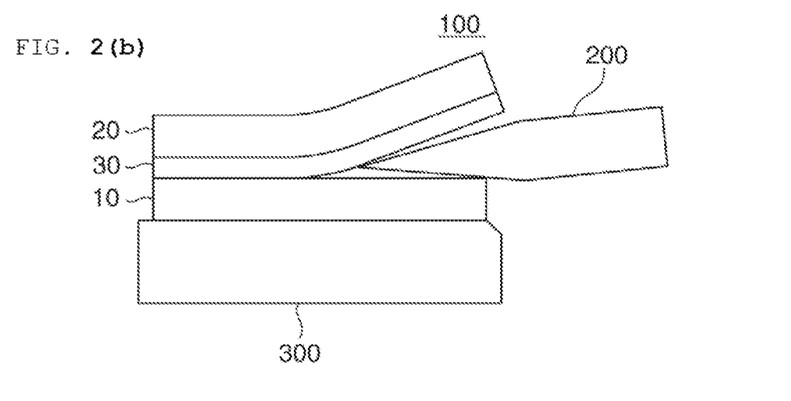
Figures 3A, 3B, 3C:
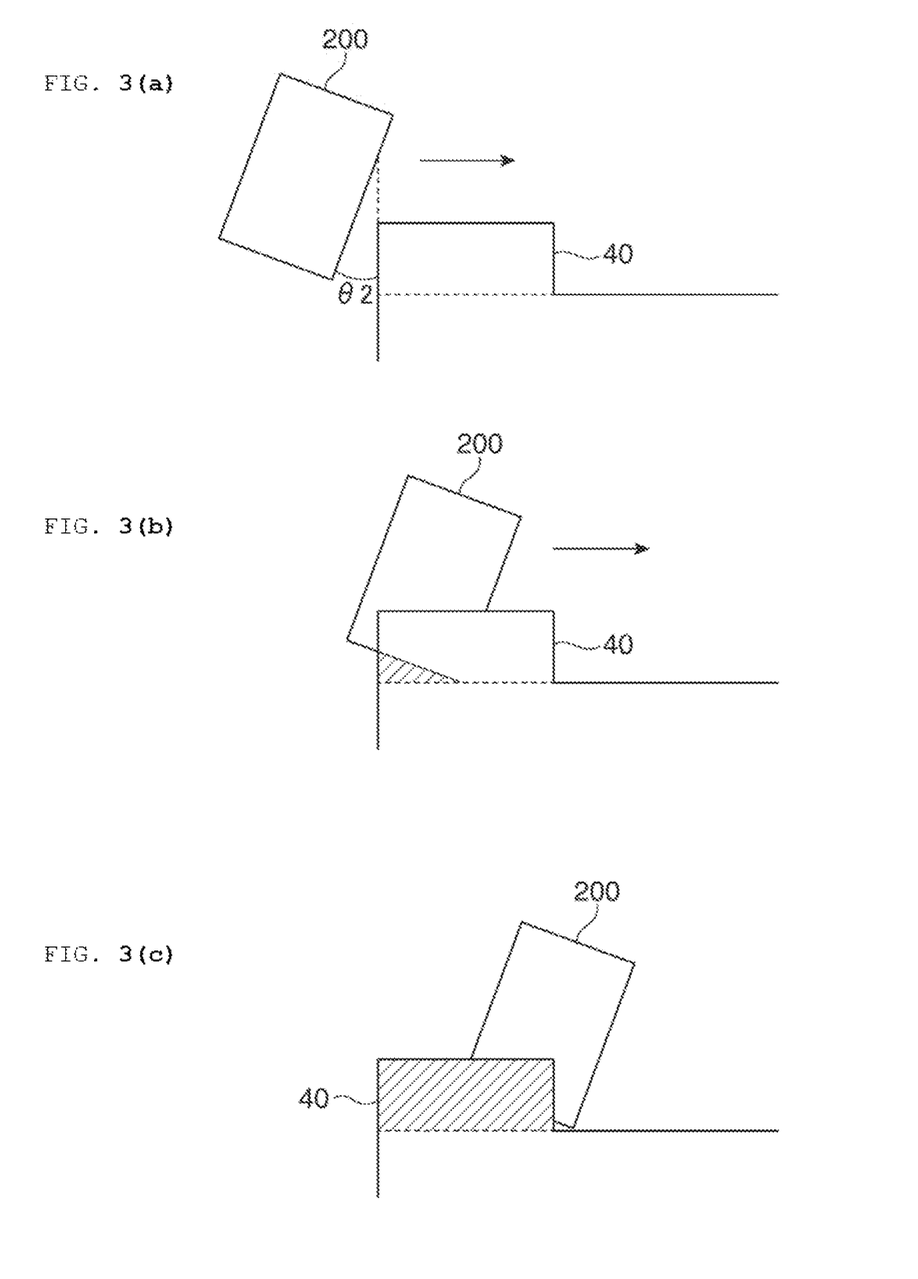
FIGS. 3(a) to 3(c) are each a schematic top view for illustrating the example of the peeling step for the base material with a transparent electrode layer illustrated in FIGS. 2(a) and 2(b).

The light control film having extending portions was placed on and fixed to a suction table so that the first base material with a transparent electrode layer was positioned on a lower side. A stainless thin plate (blade edge angle: 22°, thickness: 120 μm) having a double-edged blade on one end side was used as peeling means, and was set so that the height of the tip of the blade edge of the peeling means was matched with the center height of the liquid crystal light control layer, and so that the angle θ2 formed by the end side having the blade of the peeling means and the end side of the extending portion was 20°. When the peeling means was horizontally moved from this state toward the light control film at a speed of 5 mm/sec as illustrated in FIGS. 2(*a*) to 3(*c*), the peeling means entered along an interlayer region between the second base material with a transparent electrode layer and the liquid crystal light control layer. By moving the peeling means so that the peeling means traced the entire region of the extending portion, the second base material with a transparent electrode layer in the region was peeled off from the light control film.

3. Removal Step for Second Base Material with Transparent Electrode Layer

Figure 9:
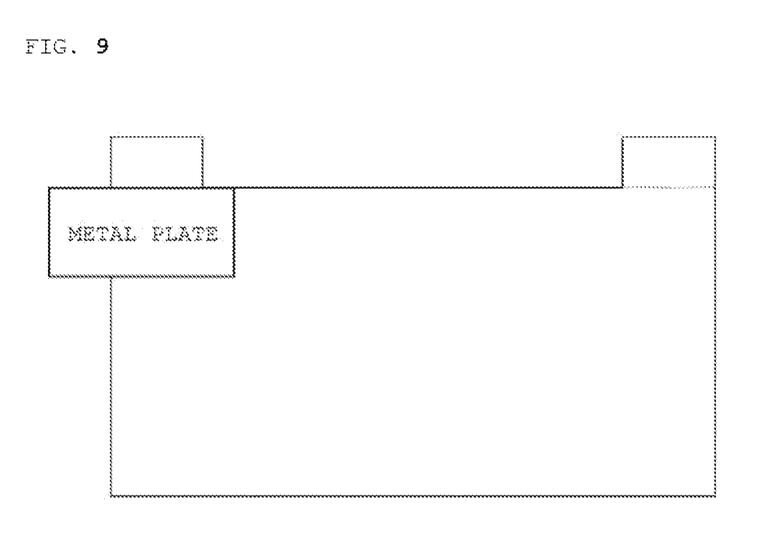
FIG. 9 is a schematic view for illustrating a peeling step in Example 1.
Figure 10:
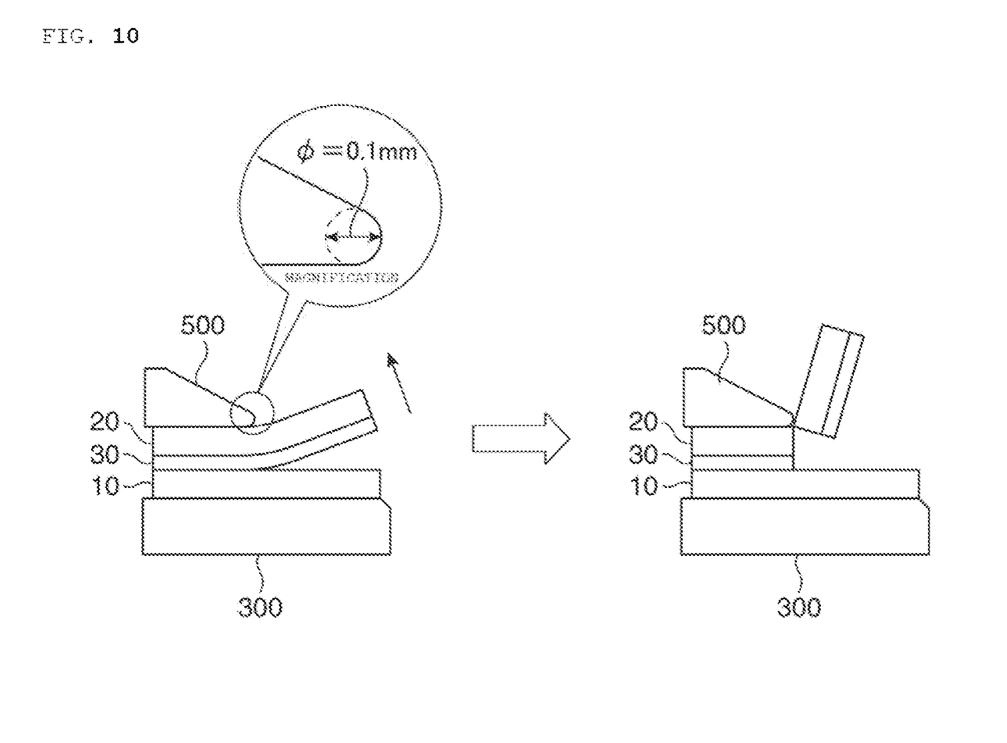
FIG. 10 is a schematic view for illustrating the peeling step in Example 1.

As illustrated in FIG. 9 and FIG. 10, the tip of the peeled second base material with a transparent electrode layer was pushed upward with a finger in a direction of 45° while a stainless metal plate having a sharp tip with a diameter of 0.1 mm was pressed as a pressure jig against the second base material with a transparent electrode layer along the base of the extending portion (at a position of 20 mm from the tip of the extending portion). As a result, the second base material with a transparent electrode layer was easily broken with the tip of the metal plate, and thus, the liquid crystal light control layer was exposed.

Anhydrous ethanol was dropped onto the exposed portion of the liquid crystal light control layer to swell the exposed portion, and was then wiped off with a waste cloth to expose the ITO electrode surface of the first base material with a transparent electrode layer. Thus, an extraction electrode portion was formed.

4. Peeling Step and Removal Step for First Base Material with Transparent Electrode Layer The light control film was turned upside down, and was placed on and fixed to the suction table. Then, the first base material with a transparent electrode layer in the other extending portion was broken in the same manner as in the peeling step and the removal step for the second base material with a transparent electrode layer. As a result, the liquid crystal light control layer did not remain on the second base material with a transparent electrode layer, and the ITO electrode surface was exposed.

A total of 20 light control films were subjected to the same treatment as that described above to obtain light control elements each having extraction electrode portions.

Comparative Example 1

In the same manner as in Example 1, a light control film having two extending portions as illustrated in FIG. 8 was obtained. The obtained light control film was placed on and fixed to a suction table so that the first base material with a transparent electrode layer was positioned on a lower side. Half-cut processing was performed by irradiating the surface of the light control film (specifically, the surface of the second base material with a transparent electrode layer) with a carbon dioxide laser so that the carbon dioxide laser traced the base portion of the extending portion (line indicated by the dotted line in the figure). As a result, the liquid crystal light control layer rather than the second base material with a transparent electrode layer started being deformed by heating, and hence half-cutting was not able to be performed.

Comparative Example 2

In the same manner as in Example 1, a light control film having two extending portions as illustrated in FIG. 8 was obtained. The obtained light control film was placed on and fixed to a suction table so that the first base material with a transparent electrode layer was positioned on a lower side. By tracing the base portion (line indicated by the dotted line in the figure) of one of the extending portions through use of a half-cutter (manufactured by OLFA Corporation, single-edged cutter, product name: "Kirinuq 209B"), half-cut processing for cutting the second base material with a transparent electrode layer was performed.

A total of 20 light control films were subjected to the above-mentioned half-cut processing. As a result, in each of two light control films, the second base material with a transparent electrode layer was cut only halfway without being half-cut. In each of the remaining 18 light control films, a cut piece of the second base material with a transparent electrode layer was peeled off. As a result, the liquid crystal light control layer was exposed. Anhydrous ethanol was dropped onto the exposed portion of the liquid crystal light control layer to swell the exposed portion, and was then wiped off with a waste cloth to expose the ITO electrode surface of the first base material with a transparent electrode layer. Thus, an extraction electrode portion was formed.

Each of the 18 light control films was turned upside down, and was placed on and fixed to the suction table. Then, in the other extending portion, half-cut processing for cutting the first base material with a transparent electrode layer was performed in the same manner as in the foregoing. As a result, in one light control film, the first base material with a transparent electrode layer was cut only halfway without being half-cut. In each of the remaining 17 light control films, a cut piece of the first base material with a transparent electrode layer was peeled off. As a result, the liquid crystal light control layer did not remain on the second base material with a transparent electrode layer, and the ITO electrode surface was exposed.

<<Electrification Inspection>>

The 20 light control elements obtained in Example 1 were subjected to an electrification inspection through application of a sine wave voltage having an effective voltage of 50 V (60 Hz). As a result, it was recognized that all the light control elements changed to a transmission mode and operated through electrification. Meanwhile, the 17 light control elements obtained in Comparative Example 2 were subjected to an electrification inspection through application of a sine wave voltage having an effective voltage of 50 V (60 Hz). As a result, it was recognized that 15 light control elements changed to a transmission mode and operated through electrification. However, two light control elements did not change in haze, and the electrification operation was not able to be recognized. The analysis of the two light control elements that were not operated through electrification found that the first transparent electrode layer was disconnected.

INDUSTRIAL APPLICABILITY

The method of the present invention is suitable for manufacturing a light control element including a liquid crystal light control layer. In particular, the method of the present invention is advantageous in the case in which the thickness of the liquid crystal light control layer is small, and hence, it is difficult to stably form an extraction electrode portion by half-cut processing including using a laser or a half cutter.

REFERENCE SIGNS LIST 10 first base material with a transparent electrode layer
12 first transparent base material
14 first transparent electrode layer
16 first hard coat layer
20 second base material with a transparent electrode layer
22 second transparent base material
24 second transparent electrode layer
26 third hard coat layer
30 liquid crystal light control layer
100 light control film
200 peeling means

The invention claimed is:

1. A method of manufacturing a light control element including an extraction electrode portion, comprising:
    obtaining a light control film including a first base material with a first transparent electrode layer and a second base material with a second transparent electrode layer arranged so that transparent electrode layers are opposed to each other, a liquid crystal light control layer sandwiched between the first base material with the first transparent electrode layer and the second base material with the second transparent electrode layer, and an extending portion extending in a direction perpendicular to a thickness direction;
    inserting peeling means between the first base material with the first transparent electrode layer and the second base material with the second transparent electrode layer in the extending portion, to thereby peel off one of the first base material with the first transparent electrode layer and the second base material with the second transparent electrode layer from the light control film; and
    bending a peeled portion of the one of the first base material with the first transparent electrode layer and the second base material with the second transparent electrode layer outward, to thereby snap the peeled portion,
    wherein the one of the first base material with the first transparent electrode layer and the second base material with the second transparent electrode layer has a breakage bending diameter of from 0.1 mm to 5 mm.

2. The method according to claim 1,
    wherein the light control film includes a first extending portion and a second extending portion,
    wherein the method comprises:
        inserting the peeling means between the first base material with the first transparent electrode layer and a second base material with the second transparent electrode layer in the first extending portion, to thereby peel off one of the first base material with the first transparent electrode layer and the first base material with the first transparent electrode layer from the light control film;
        bending a peeled portion of the one of the first base material with the first transparent electrode layer and a second base material with the second transparent electrode layer outward, to thereby snap the peeled portion;
        inserting the peeling means between the first base material with the first transparent electrode layer and a second base material with the second transparent electrode layer in the second extending portion, to thereby peel off another of the first base material with the first transparent electrode layer and a second base material with the second transparent electrode layer from the light control film; and
        bending a peeled portion of the another of the first base material with the first transparent electrode layer and a second base material with the second transparent electrode layer outward, to thereby snap the peeled portion, and
    wherein the first base material with the first transparent electrode layer and a second base material with the second transparent electrode layer each have a breakage bending diameter of from 0.1 mm to 5 mm.

3. The method according to claim 1, wherein an interface between the first base material with the first transparent electrode layer and the liquid crystal light control layer and/or an interface between a second base material with the second transparent electrode layer and the liquid crystal light control layer has a peeling strength of from 0.2 N/25 mm to 5 N/25 mm.

4. The method according to claim 1,
wherein the first base material with the first transparent electrode layer and/or the second base material the second transparent electrode layer includes a transparent base material and the transparent electrode layer arranged on one side of the transparent base material, and
wherein a material for forming the transparent base material includes at least one kind selected from the group consisting of glass, a cycloolefin-based resin, and an acrylic resin.

5. The method according to claim 1, wherein the first base material with the first transparent electrode layer and/or the second base material with the second transparent electrode layer includes a transparent base material, the transparent electrode layer arranged on one side of the transparent base material, and a hard coat layer arranged on another side of the transparent base material.

6. The method according to claim 1, wherein the first base material with the first transparent electrode layer and/or the second base material with the second transparent electrode layer includes a transparent base material, the transparent electrode layer arranged on one side of the transparent base material, and hard coat layers arranged on another side of the transparent base material, and between the transparent base material and the transparent electrode layer.

7. The method according to claim 1, wherein the liquid crystal light control layer has a thickness of 15 µm or less.

\* \* \* \* \*

UNITED STATES PATENT AND TRADEMARK OFFICE
CERTIFICATE OF CORRECTION

PATENT NO. : 12,050,385 B2
APPLICATION NO. : 17/274967
DATED : July 30, 2024
INVENTOR(S) : Masanori Otsuka et al.

It is certified that error appears in the above-identified patent and that said Letters Patent is hereby corrected as shown below:

In the Claims

Claim 2, Column 16, Line 38:
"a second base material with the second transparent"
Should be:
--the second base material with the second transparent--

Claim 2, Column 16, Line 41:
"first transparent electrode layer and the first base"
Should be:
--first transparent electrode layer and the second base--

Claim 2, Column 16, Line 42:
"material with the first transparent electrode layer"
Should be:
--material with the second transparent electrode layer--

Claim 2, Column 16, Line 50:
"a second base material with the second transparent"
Should be:
--the second base material with the second transparent--

Claim 2, Column 16, Line 53:
"the first transparent electrode layer and a second base"
Should be:
--the first transparent electrode layer and the second base--

Claim 2, Column 16, Line 58:
"a second base material with the second transparent"

Signed and Sealed this
Twenty-ninth Day of October, 2024

*Katherine Kelly Vidal*
Katherine Kelly Vidal
*Director of the United States Patent and Trademark Office*

Should be:
--the second base material with the second transparent--

Claim 2, Column 16, Line 62:
"electrode layer and a second base material with the"
Should be:
--electrode layer and the second base material with the--

Claim 3, Column 17, Line 1:
"and/or an interface between a second base material with the"
Should be:
--and/or an interface between the second base material with the--